US009897161B2

(12) United States Patent
Churchill et al.

(10) Patent No.: US 9,897,161 B2
(45) Date of Patent: Feb. 20, 2018

(54) HINGELESS, LARGE-THROW NEGATIVE STIFFNESS STRUCTURE

(71) Applicant: HRL Laboratories, LLC, Malibu, CA (US)

(72) Inventors: Christopher B. Churchill, Ventura, CA (US); David W. Shahan, Los Angeles, CA (US); Geoffrey P. McKnight, Los Angeles, CA (US); Guillermo A. Herrera, Winnetka, CA (US)

(73) Assignee: HRL Laboratories, LLC, Malibu, CA (US)

( * ) Notice: Subject to any disclaimer, the term of this patent is extended or adjusted under 35 U.S.C. 154(b) by 542 days.

(21) Appl. No.: 14/565,334

(22) Filed: Dec. 9, 2014

(65) Prior Publication Data

US 2016/0348752 A1    Dec. 1, 2016

(51) Int. Cl.
*F16F 15/073*   (2006.01)
*F16F 1/22*   (2006.01)
*F16F 3/02*   (2006.01)

(52) U.S. Cl.
CPC .............. *F16F 15/073* (2013.01); *F16F 3/02* (2013.01); *F16F 2228/063* (2013.01)

(58) Field of Classification Search
CPC .... F16F 1/22; F16F 3/02; F16F 15/073; F16F 2228/063
USPC ............................................ 267/47; 188/378
See application file for complete search history.

(56) References Cited

U.S. PATENT DOCUMENTS

| 3,644,688 A | * | 2/1972 | Tustin ...................... B60M 1/20 |
| | | | 191/40 |
| 4,607,382 A | | 8/1986 | Dijkstra et al. |
| 4,778,037 A | | 10/1988 | Papadopoulos |

(Continued)

FOREIGN PATENT DOCUMENTS

| DE | 506031 C | * | 8/1930 | ................. F16F 1/26 |
| DE | 102010027954 A1 | * | 10/2011 | .......... F16C 32/0434 |
| JP | 2014-020502 A | | 2/2014 | |

OTHER PUBLICATIONS

Alabuzhev et al., "Vibration Protection and Measuring Systems with Quasi-Zero Stiffness," Hemisphere Publishing Corp., 1989, 56 pages.

(Continued)

*Primary Examiner* — Robert A Siconolfi
*Assistant Examiner* — San Aung
(74) *Attorney, Agent, or Firm* — Lewis Roca Rothgerber Christie LLP

(57) ABSTRACT

A negative stiffness structure for vibration isolation, shock mitigation, and/or signal processing includes a flexible tensile member and a curved compressive member. A first end of the tensile member is attached to a first structure. A first end of the curved compressive member is coupled to a first structure and a second end of the curved compressive member is coupled to a second end of the flexible tensile member. A length of the tensile member is greater than a length of the compressive member. A tip of the negative stiffness structure is configured to exhibit a negative stiffness mechanical response to a load applied to the tip. The negative stiffness mechanical response acts in a direction orthogonal to the length of the tensile member.

15 Claims, 10 Drawing Sheets

(56) References Cited

U.S. PATENT DOCUMENTS

| | | | | | |
|---|---|---|---|---|---|
| 4,987,507 | A | * | 1/1991 | Steltzer | F16F 1/18 360/261.1 |
| 5,947,453 | A | * | 9/1999 | Eastman | F16F 1/185 244/17.11 |
| 7,550,880 | B1 | * | 6/2009 | Pusl | F16F 1/185 310/15 |
| 2006/0263082 | A1 | * | 11/2006 | Brown | F16F 1/12 396/421 |
| 2011/0187036 | A1 | * | 8/2011 | Duval | B25J 19/0016 267/177 |
| 2011/0278425 | A1 | | 11/2011 | Park | |
| 2013/0118098 | A1 | | 5/2013 | Constantinou et al. | |
| 2014/0190677 | A1 | * | 7/2014 | Platus | F28F 9/26 165/185 |

OTHER PUBLICATIONS

Guérinot et al., "Compliant Joint Design Principles for High Compressive Load Situations," Transactions of the ASME, 127:774-781, Jul. 2005.
Schenk et al., "Zero Stiffness Tensegrity Structures," International Journal of Solids and Structures, Jan. 22, 2007, 23 pages.
Written Opinion and Search Report for PCT Application No. PCT/US2014/069404, dated Aug. 6, 2015, 10 pages.
International Preliminary Report on Patentability for Corresponding PCT Application No. PCT/US2014/069404, dated Jun. 22, 2017 (6 pages).

* cited by examiner

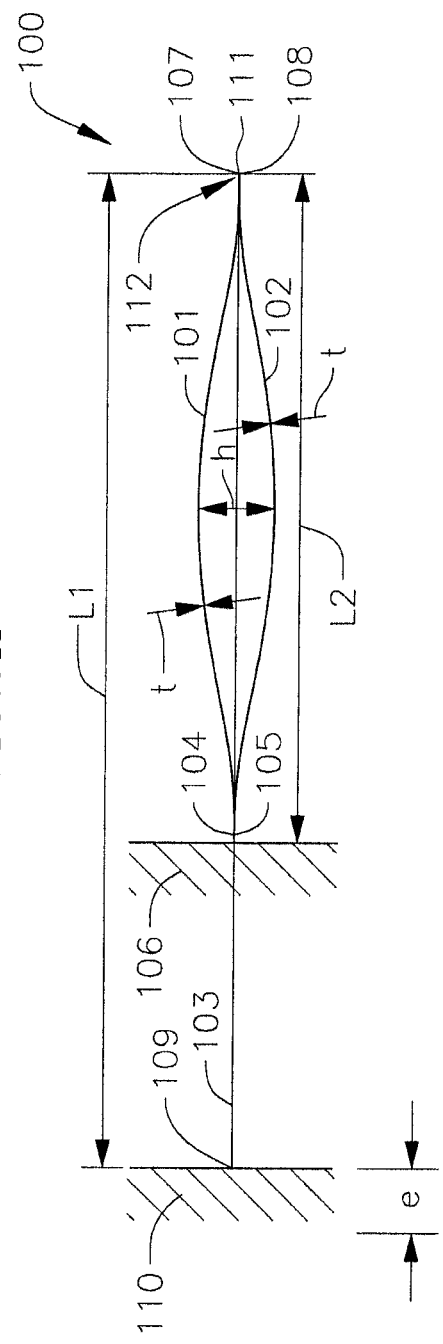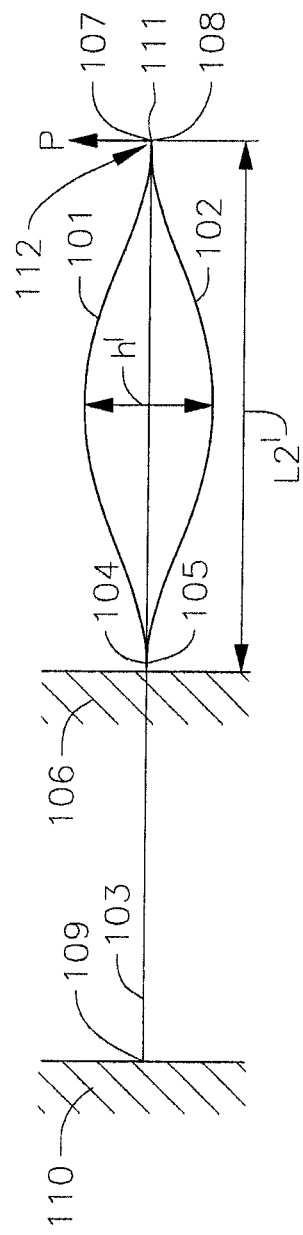
FIG.1A
FIG.1B

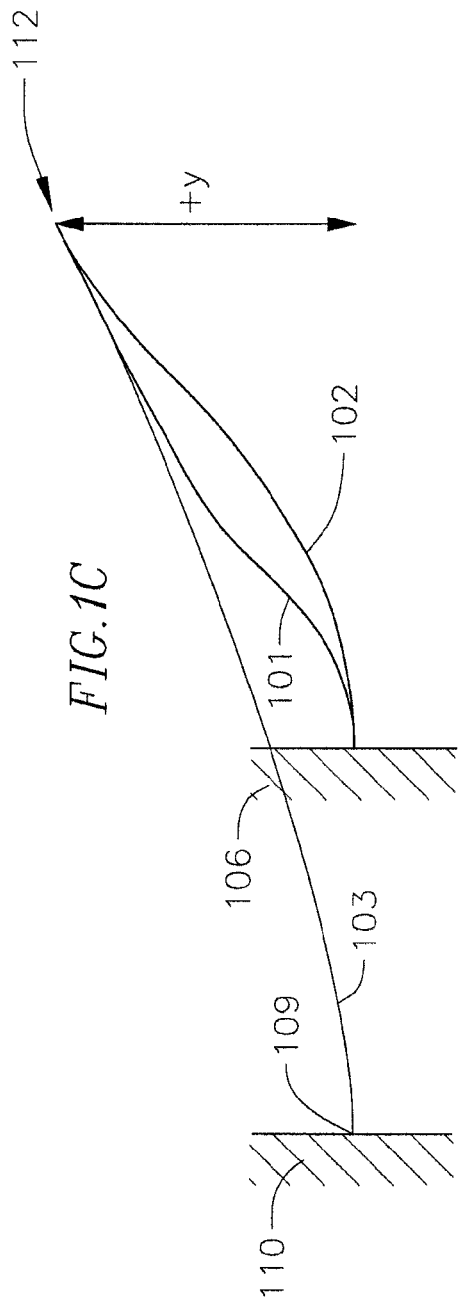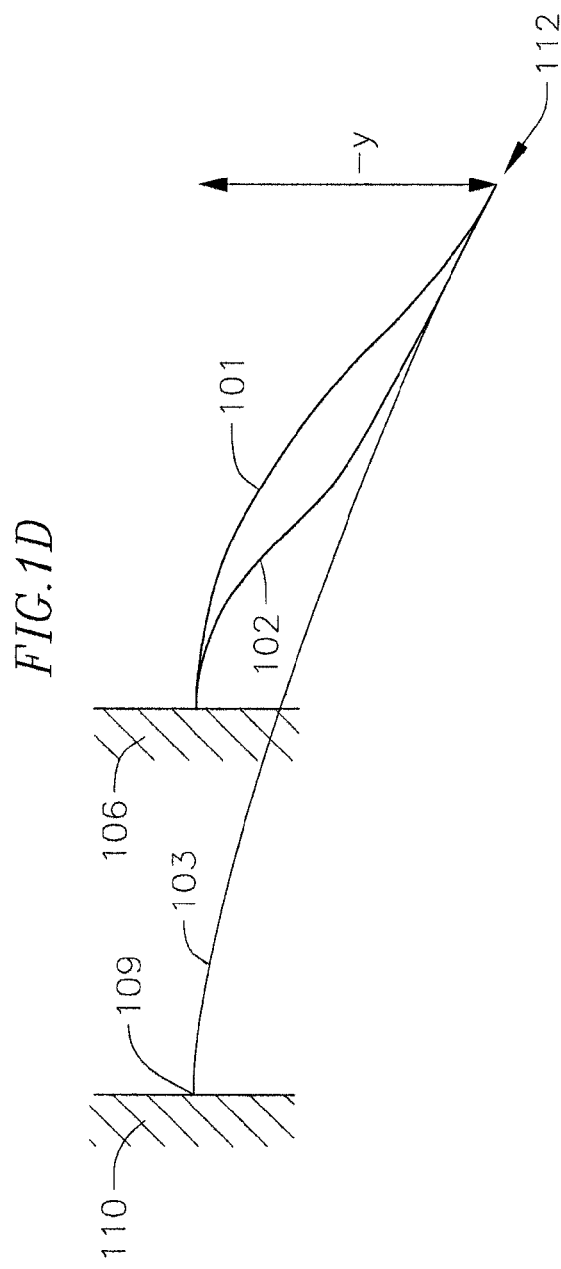

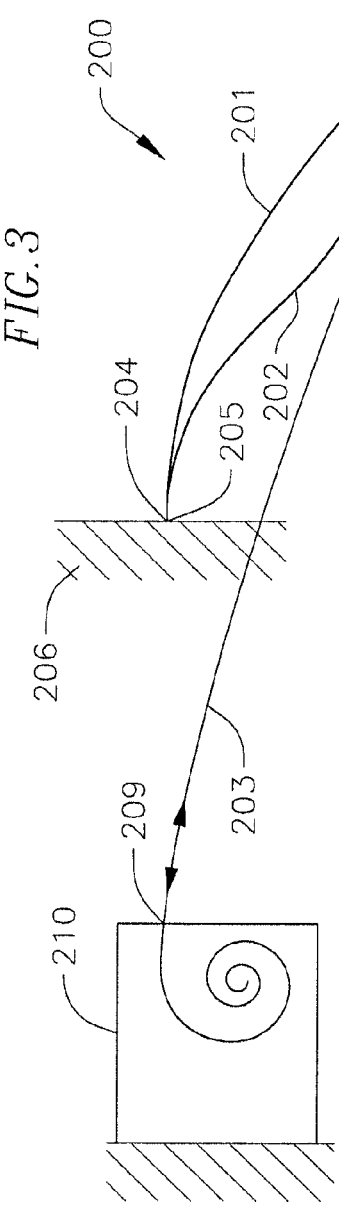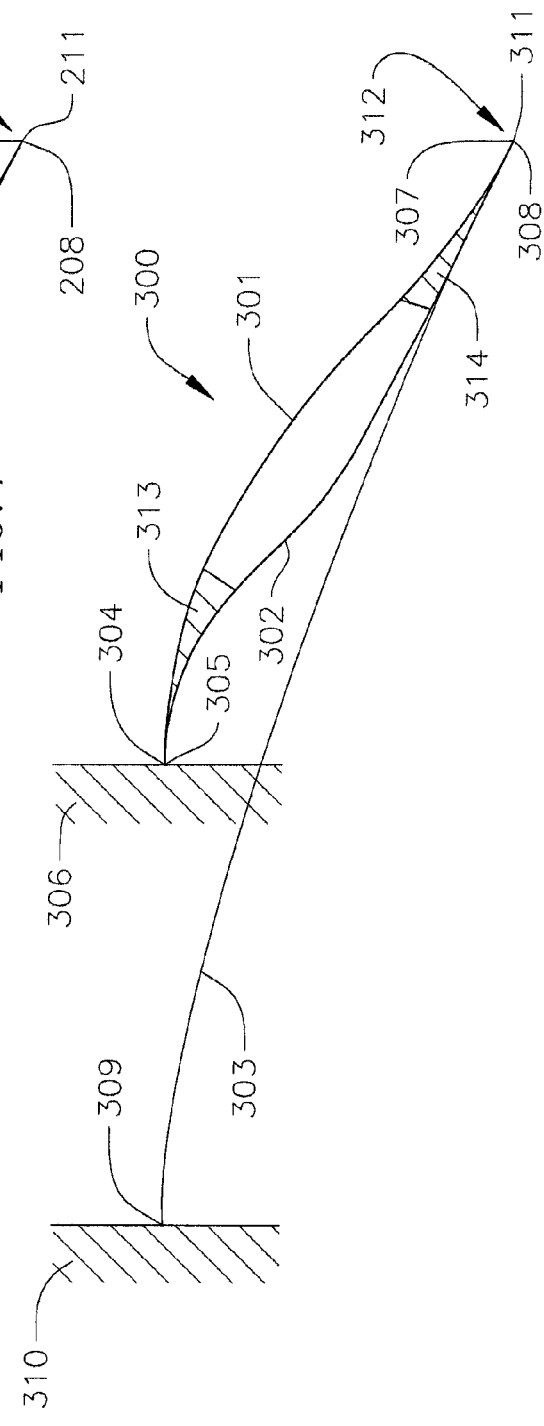

HINGELESS, LARGE-THROW NEGATIVE STIFFNESS STRUCTURE

FIELD

The following description relates generally to negative stiffness structures and, more particularly, hingeless negative stiffness structures.

BACKGROUND

A variety of non-linear structures exhibit negative mechanical stiffness, such as snap-through beams and buckling beams. Negative stiffness may also be exhibited by various combinations and arrangements of springs and/or beams with pinned or clamped boundaries. For instance, negative stiffness may be exhibited due to over-rotation of one of the components, or rolling or sliding contact between components. Negative stiffness mechanisms are useful in a variety of applications, including vibration isolation, shock mitigation, and signal processing.

However, related art negative stiffness mechanisms may incorporate pins, hinges, or sliding mechanical joints which increase the complexity and cost of the mechanism. Related art negative stiffness mechanisms also typically include a bearing component, which increases the cost of the mechanism and increases friction and wear, which may limit the useful life of the mechanism. Additionally, related art negative stiffness mechanisms generally have a relatively small range of motion (e.g., a low throw to beam length ratio). For instance, related art negative stiffness mechanisms may be limited to a beam length to throw ratio of approximately or about 20:1 or 10:1.

SUMMARY

The present disclosure is directed to various embodiments of negative stiffness structures. In one embodiment, the negative stiffness structure includes at least one flexible tensile member and at least one curved compressive member. A first end of the flexible tensile member is coupled to a first structure. A first end of first end of the curved compressive member is coupled to a second structure and a second end of the curved compressive member is coupled to a second end of the flexible tensile member. A length of the flexible tensile member is greater than a length of the curved compressive member. A tip of the negative stiffness structure is configured to exhibit a negative stiffness mechanical response to a load applied to the tip. The negative stiffness mechanical response acts in a direction orthogonal to the length of the tensile member.

The compressive member may have a substantially uniform thickness or a non-uniform thickness. The at least one curved compressive member may include a stack of a series of curved compressive members. The at least one flexible tensile member may include a series of tensile members. The at least one compressive member may be a rectangular beam. The at least one tensile member may be a beam, a rope, a cable, a rod, a chain, or a belt.

The negative stiffness structure may also include a second curved compressive member having a first end coupled to the second structure and a second end coupled to the second end of the tensile member. The first compressive member may be buckled in a first direction and the second compressive member may be buckled in a second direction opposite the first direction. The first and second compressive members may be cosine shaped. The negative stiffness structure may also include first and second wedge-shaped inserts between the first compressive member and the second compressive member. The first wedge-shaped insert may be proximate the first ends of the first and second compressive members, and the second wedge-shaped insert may be proximate the second ends of the first and second compressive members.

The first structure may include a pair of curved walls defining a tapered recess. The first end of the tensile member may be received in the tapered recess. The negative stiffness structure may include an actuator coupled to the first end of the tensile member. The actuator may be configured to adjust tension applied to the tensile member or adjust an effective length of the tensile member to vary the mechanical response of the tip. The negative stiffness structure may include a clamping actuator coupled to the first end of the tensile member. The clamping actuator may be configured to clamp the tensile member at a plurality of positions along a length of the tensile member. The second structure may include a clutching mechanism including a first clutching member having a convex surface and a second clutching member having a concave surface mating with the convex surface of the first clutching member. The second clutching member may be configured to slide along the convex surface of the first clutching member between a first angular position and a second angular position.

In one embodiment, the negative stiffness structure includes at least one flexible tensile member, an actuator coupled to a first end of the at least one flexible tensile member, and first and second curved compressive members. First ends of the curved compressive members are coupled to a structure. Second ends of the curved compressive members are coupled to a second end of the flexible tensile member. A length of the tensile member is greater than a length of each of the first and second curved compressive members. The first curved compressive member is curved in a first direction and the second curved compressive member is curved in a second direction opposite the first direction. A tip of the negative stiffness structure is configured to exhibit a mechanical response when a load is applied to the tip. The actuator is configured to vary the mechanical response of the tip. The actuator may be a toothed gear, a pulley, or a clamp configured to clamp the tensile member at a series of positions along the length of the tensile member.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 1A is a schematic side view of a negative stiffness structure including a tensile member and a pair of compressive members according to one embodiment of the present disclosure in a first position;

FIG. 1B is a side view of the negative stiffness structure of FIG. 1A in a second position by tensioning the tensile member;

FIG. 1C is a side view of the negative stiffness structure of FIG. 1A in a third position by deflecting a tip of the negative stiffness structure upward;

FIG. 1D is a side view of the negative stiffness structure of FIG. 1A in a fourth position by deflecting a tip of the negative stiffness structure downward;

FIG. 3 is a schematic side view of a negative stiffness structure according to another embodiment of the present disclosure;

FIG. 4 is a schematic side view of a negative stiffness structure according to another embodiment of the present disclosure;

DETAILED DESCRIPTION

Figure 2:
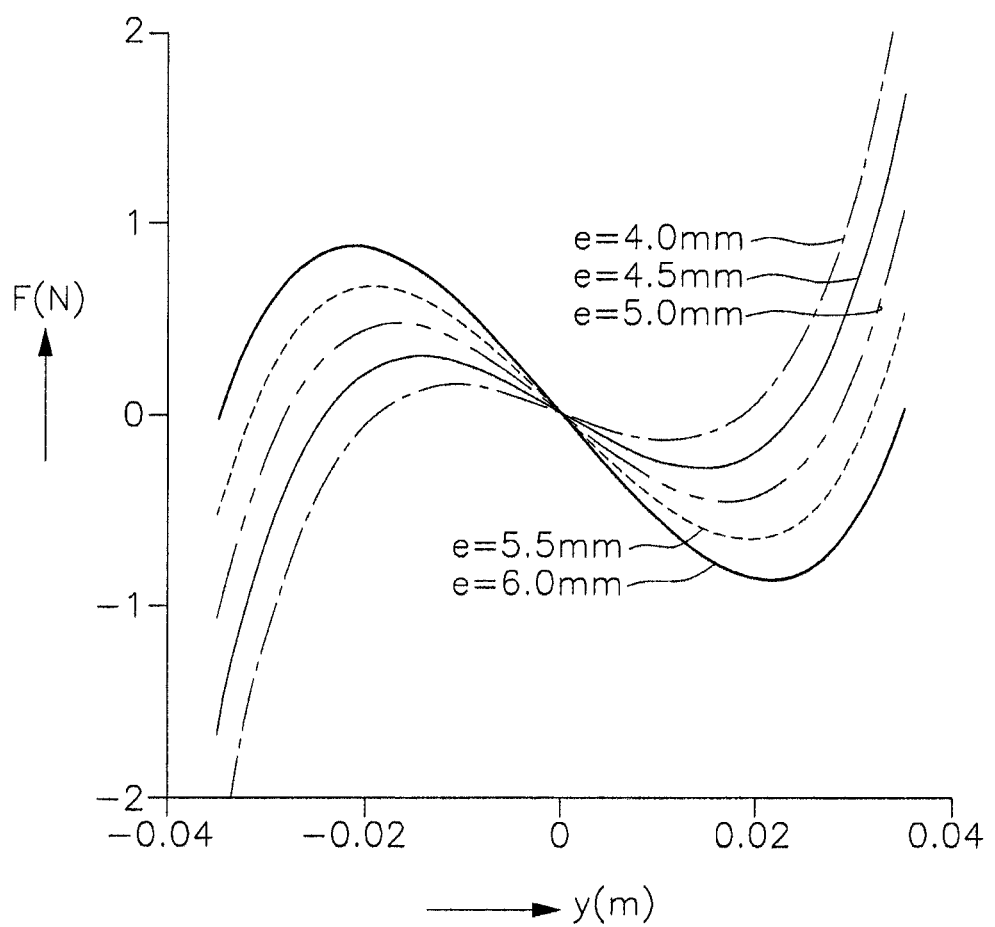
FIG. 2 is a graph illustrating the mechanical response of a negative stiffness structure according to one embodiment of the present disclosure for a range of different effective lengths of the tensile member.

The present disclosure is directed to various embodiments of a negative stiffness structure. Embodiments of the negative stiffness structure are configured to vary the mechanical response of the structure (i.e., a tunable or variable negative stiffness structure). Embodiments of the negative stiffness structure are also hingeless. The negative stiffness structures of the present disclosure may be incorporated into any desired structure or device depending on the intended purpose or function of the negative stiffness structure, such as, for instance, as a tuned-mass damper or as a mechanism for vibration isolation, shock mitigation, or signal processing. For instance, the negative stiffness structures of the present disclosure may be incorporated into a structure as an equipment mount (e.g., a mount for a gyroscope), as a component of an active or passive vehicle suspension (e.g., for vibration isolation between the engine and the chassis and/or between a wheel and the road), or as a component of an aircraft (e.g., for vibration isolation between a helicopter blade and a hub of the helicopter).

With reference now to FIGS. 1A-1D, a negative stiffness structure 100 according to one embodiment of the present disclosure includes a pair of compressive elements or members 101, 102 and a tensile element or member 103. In the illustrated embodiment, the compressive members 101, 102 are placed in compression and the tensile member 103 is placed in tension. Such structures in which the components are segregated into pure tension and pure compression members are known as tensegrity structures. An inner or base end 104, 105 of each of the compressive members 101, 102, respectively, is fixedly coupled (e.g., clamped or pinned or coupled through a flexible member (e.g., a rubber bushing)) to a first structure 106 and outer ends 107, 108 of the compressive members 101, 102 are free (i.e., the compressive members 101, 102 are cantilevered from the first structure 106). In the illustrated embodiment, the inner ends 104, 105 and the outer ends 107, 108, respectively, of the compressive members 101, 102 are coupled together. Additionally, in the illustrated embodiment, an inner or base end 109 of the tensile member 103 is coupled to a second structure 110 and an outer end 111 of the tensile member 103 is connected to the outer ends 107, 108 of the compressive members 101, 102. Additionally, the tensile member 103 may pass through or around the first structure 106 such that the tensile member 103 is not coupled to the first structure 106. Together, the outer ends 111, 107, 108 of the tensile member 103 and the compressive members 101, 102 define a tip 112 of the negative stiffness structure 100.

Although in the illustrated embodiment, the negative stiffness structure 100 includes a pair of compressive members 101, 102, in one or more alternate embodiments, the negative stiffness structure 100 may have any other suitable number of compressive members, such as, for instance, from one to twenty. In one embodiment, the negative stiffness structure 100 may include one or more stacks of compressive members, such as, for instance, stacks of up to ten or more compressive members (e.g., upper and/or lower stacks of compressive members). Although in one embodiment each stack may include the same number of compressive members (e.g., the number of compressive members in the upper and lower stacks may be symmetric about the tensile member 103), in one or more alternate embodiments, the stacks may have different numbers of compressive members. Additionally, in the illustrated embodiment, the compressive members 101, 102 are rectangular beams, although in one or more alternate embodiments, the compressive members 101, 102 may have any other suitable shape.

Additionally, in the illustrated embodiment, the compressive members 101, 102 are preformed into a curved or contoured shape (e.g., a bell curve or a cosine shape with a single hump). In one embodiment, the compressive member 101, 102 may have any other suitable shape after being compressed. The compressive members 101, 102 in the illustrated embodiments are also curved or contoured in opposite directions (e.g., the upper compressive member 101 is curved upward and the lower compressive member 102 is curved downward). Accordingly, in the illustrated embodiment, the inner and outer ends of the respective compressive members contact each other and intermediate portions of the compressive members 101, 102 between the inner and outer ends are spaced apart, by a maximum amplitude h. For instance, in the illustrated embodiment, the central portions of the compressive members 101, 102 are spaced apart by amplitude h. Additionally, although in the illustrated embodiment each of the compressive members 101, 102 has a substantially constant thickness t, in one or more alternate embodiments, one or more of the compressive members 101, 102 may have a non-uniform thickness. Furthermore, although in the illustrated embodiment the upper compressive member 101 has the same or substantially the same thickness profile as the lower compressive member 102, in one or more alternate embodiments, the upper compressive member 101 may have a different thickness profile than the lower compressive member 102.

In one embodiment, the compressive members 101, 102 may be formed from any material having a relatively high elastic strain limit, such as, for instance, fiberglass, titanium, or combinations thereof. In one or more alternate embodiments, the compressive members 101, 102 may be formed out of any other suitable material, such as, for instance, steel, silicon, or combinations thereof.

With continued reference to the embodiment illustrated in FIGS. 1A-1D, the tensile member 103 may be any structure suitable for carrying tensile loads, such as, for instance, a beam, a rope (e.g., a wire or Kevlar rope), a cable (e.g., a braided cable), a thin rod, a chain, or a drive belt. In one embodiment, the tensile member 103 may be a rectangular beam that is the same or similar to one of the compressive members 101, 102, but without the preformed shape (e.g., the tensile member 103 may be a flat rectangular beam). Additionally, in one embodiment, the tensile member 103 may be flexible such that the tensile member 103 has a low bending stiffness, but is stiff when a tensile load is applied to the tensile member 103. Additionally, the tensile member 103 may have a low or relatively low bending stiffness in only one plane, which may aid in restricting the motion of the negative stiffness structure 100 to a single plane (e.g., the tensile member 103 may be a roller chain with low bending stiffness in only one plane). In one or more alternate embodiments, the tensile member 103 may have a bending stiffness configured to provide a positive stiffness to the negative stiffness structure 100 that would stabilize the negative stiffness structure 100 into a finite stiffness structure. If the positive stiffness of the tensile member 103 is only slightly higher than the negative stiffness of the compressive members 101, 102, the positive and negative stiffnesses combine to create a quasi-zero-stiffness (QZS) structure 100.

In an initial state illustrated in FIG. 1A, the tensile member 103 has an initial length $L_1$ and the linear distance between the inner ends 104, 105 and the outer ends 107, 108 of the compressive members 101, 102 has an initial length $L_2$. In the illustrated embodiment, the length $L_1$ of the tensile member 103 is longer than the initial length $L_2$ between the inner ends 104, 105 and the outer ends 107, 108 of the compressive members 101, 102. As illustrated in FIG. 1B, the effective length of the tensile member 103 and/or the tension applied to the tensile member 103 may be varied based on the desired mechanical response of the negative stiffness structure 100 (i.e., the negative stiffness response of the structure 100 may be adjusted by changing the tension applied to the tensile member 103 and/or the effective length of the tensile member 103). Tensioning the tensile member 103 is configured to increase the compressive load on the compressive members 101, 102 by decreasing the distance $L_2'$ between the inner ends 104, 105 and the outer ends 107, 108 of the compressive members 101, 102. Additionally, as illustrated in FIG. 1B, increasing the compressive load on the compressive members 101, 102 increases the maximum amplitude h' between the intermediate portions of the compressive members 101, 102. Tension may be applied to the tensile member 103 by pulling on the inner end of the tensile member 103 with any suitable mechanism. In the embodiment illustrated in FIG. 1B, the tension applied to the tensile member 103 may be increased by moving the second structure 110 to which the inner end of the tensile member 103 is fixedly coupled by a distance e in a direction away from the outer end 111 of the tensile member 103. In another embodiment, the inner end 109 of the tensile member 103 may be coupled to an actuator (e.g., a pulley or a gear) configured to decrease the effective length of the tensile member 103 and thereby increase the tension load applied to the tensile member 103.

As illustrated in FIG. 1C, when an upward force is applied to the tip 112 of the negative stiffness structure 100 (i.e., the common outer ends 111, 107, 108 of the tensile member 103 and the compressive members 101, 102) such that the tip 112 is deflected upward in the +y direction, the structure 100 is configured to initially exhibit a positive stiffness resisting the upward deflection. However, as the force and the magnitude of the upward deflection increase, the structure 100 will reach a snap-through point at which the structure 100 will "snap-through" to a stable higher position, shown in FIG. 1C. During snap through, the structure 100 exhibits negative stiffness. That is, the tip 112 of the structure 100 exhibits an upward force (i.e., a force in the direction in which the load was applied to the tip 112 of the structure 100). Accordingly, the structure 100 exhibits non-linear stiffness across the range of upward deflections of the tip 112 of the structure 100 (i.e., the structure 100 exhibits both positive and negative stiffness as the tip 112 of the structure 100 is deflected upward).

Similarly, as illustrated in FIG. 1D, when a downward force is applied to the tip 112 of the structure 100 such that the tip 112 is deflected downward in the −y direction, the structure 100 is initially configured to exhibit a positive stiffness resisting the downward deflection. However, as the force and the magnitude of the downward deflection increase, the structure 100 will reach a snap-through point at which the structure 100 will snap-through to a stable lower position, shown in FIG. 1D. During snap through, the structure 100 exhibits negative stiffness. That is, the tip 112 of the structure 100 exhibits a downward force (i.e., a force in the direction in which the load was applied to the tip 112 of the structure 100).

The force exhibited at the tip 112 of the structure 100 may be transferred to the system or device into which the negative stiffness structure 100 is incorporated by any suitable mechanism, such as, for instance, a tie rod or other suitable push-pull mechanism.

FIG. 2 is a plot showing the resolved vertical force at the tip 112 of the structure 100 when the inner end 109 of the tensile member 103 had been pulled by a range of different distances e (see FIG. 1A) from approximately or about 4 mm to approximately or about 6 mm away from the outer end 111 of the tensile member 103. The plot shown in FIG. 2 was obtained from a negative stiffness structure 100 that included a wire rope tensile member 103 having a diameter of approximately or about 1/16 inch and an initial length $L_1$ of approximately or about 150 mm. Each of the upper and lower compressive members 101, 102 were preformed in opposite directions into a cosine shape and had an initial length $L_2$ of approximately or about 100 mm between the inner ends 104, 105 and the outer ends 107, 108 of the compressive members 101, 102. Additionally, each of the compressive members 101, 102 was a rectangular beam having a width of approximately or about 10 mm and a constant thickness t of approximately or about 0.3 mm. In the initial state, the maximum distance or amplitude h between the intermediate portions of the upper and lower compressive members 101, 102 was approximately or about 10 mm. In particular, FIG. 2 shows the resolved vertical force at the tip 112 of the structure 100 when the inner end 109 of the tensile member 103 had been pulled by a distance e of approximately or about 4.0 mm, approximately or about 4.5 mm, approximately or about 5.0 mm, approximately or about 5.5 mm, and approximately or about 6.0 mm.

As illustrated in FIG. 2, when the inner end 109 of the tensile member 103 had been pulled by a distance e of approximately or about 4.0 mm from its initial position, the structure 100 exhibited positive stiffness for tip 112 deflections from approximately or about −0.01 m to approximately or about +0.01 m and exhibited negative stiffness for tip 112 deflections from approximately or about −0.01 m to approximately or about −0.04 m and from approximately or about +0.01 m to approximately or about +0.04 m. Additionally, when the inner end 109 of the tensile member 103 had been pulled by a distance e of approximately or about 4.0 mm, the structure 100 exhibited a maximum positive stiffness force of approximately or about 0.1 N at a tip 112 deflection of approximately or about 0.01 m, and a maximum negative stiffness force of approximately or about 2 N at a tip 112 deflection of approximately or about 0.04 m. Accordingly, the embodiment of the negative stiffness structure 100 tested was configured to exhibit maximum negative stiffness at a throw (i.e., deflection of the tip 112) of approximately or about 40% of the length $L_2$ between the inner ends 104, 105 and the outer ends 107, 108 of the compressive members 101, 102 (i.e., the structure 100 exhibited maximum negative stiffness at a throw of approximately or about 40 mm and the initial length $L_2$ between the inner ends 104, 105 and the outer ends 107, 108 of the compressive members 101, 102 was approximately or about 100 mm).

When the inner end 109 of the tensile member 103 had been pulled by a distance e of approximately or about 6.0 mm, the structure 100 exhibited positive stiffness for tip 112 deflections from approximately or about −0.02 m to approximately or about +0.02 m and exhibited negative stiffness for tip 112 deflections from approximately or about −0.02 m to approximately or about −0.04 m and from approximately or about +0.02 m to approximately or about +0.04 m. Accordingly, increasing the tension applied to the tensile member 103 is configured to increase the range of tip 112 deflections over which the structure 100 is configured to exhibit positive stiffness. Additionally, when the inner end 109 of the tensile member 103 had been pulled by a distance e of approximately or about 6.0 mm, the structure 100 exhibited a maximum positive stiffness force of approximately or about 0.9 N at a tip deflection of approximately or about 0.02 m and a maximum negative stiffness force of approximately or about 0 N at a tip deflection of approximately or about 0.04 m.

With reference now to FIG. 3, a negative stiffness structure 200 according to another embodiment of the present disclosure includes a pair of upper and lower compressive members 201, 202 and a tensile member 203. Inner ends 204, 205 of the compressive members 201, 202, respectively, are fixedly coupled to a structure 206 and outer ends 207, 208 of the compressive members 201, 202 are free. In the illustrated embodiment, the inner ends 204, 205 and the outer ends 207, 208, respectively, of the compressive members 201, 202 are coupled together. The compressive members 201, 202 are preformed into a curved or contoured shape (e.g., a cosine shape) extending in opposite directions (e.g., the upper compressive member 201 is curved upward and the lower compressive member 202 is curved downward). Additionally, in the illustrated embodiment, an inner end 209 of the tensile member 203 is operatively coupled to an actuator 210 and an outer end 211 of the tensile member 203 is coupled to the outer ends 207, 208 of the compressive members 201, 202. Together, the outer ends 211, 207, 208 of the tensile member 203 and the compressive members 201, 202 define a tip 212 of the negative stiffness structure 200. The tensile member 203 and the compressive members 201, 202 may be the same or similar to the tensile member 103 and the compressive members 101, 102 described above with reference to the embodiment illustrated in FIGS. 1A-1D.

The actuator 210 is configured to reduce the effective length of the tensile member 203 and/or increase the tension applied to the tensile member 203 to modify the mechanical response of the structure 200 when a load is applied to the tip 212 of the structure 200. For instance, in one embodiment, the mechanical response of the structure 200 may vary as shown in FIG. 2 depending on the effective length and/or the tension load applied to the tensile member 203. The actuator 210 may be any suitable type or kind of actuator configured to reduce the effective length of the tensile member 203 and/or increase the tension applied to the tensile member 203, such as, for instance, a toothed gear mechanism or a pulley.

With reference now to the embodiment illustrated in FIG. 4, a negative stiffness structure 300 according to another embodiment of the present disclosure includes a pair of upper and lower compressive members 301, 302 and a tensile member 303. Inner ends 304, 305 of the compressive members 301, 302, respectively, are fixedly coupled to a first structure 306 and outer ends 307, 308 of the compressive members 301, 302 are free. In the illustrated embodiment, the inner ends 304, 305 and the outer ends 307, 308, respectively, of the compressive members 301, 302 are coupled together. The compressive members 301, 302 are preformed into a curved or contoured shape (e.g., a cosine shape) extending in opposite directions (e.g., the upper compressive member 301 is curved upward and the lower compressive member 302 is curved downward). Additionally, in the illustrated embodiment, an inner end 309 of the tensile member 303 is coupled to a second structure 310 and an outer end 311 of the tensile member 303 is coupled to the outer ends 307, 308 of the compressive members 301, 302. Together, the outer ends 311, 307, 308 of the tensile member 303 and the compressive members 301, 302 define a tip 312 of the negative stiffness structure 300. In one or more alternate embodiments, the inner end 309 of the tensile member 303 may be coupled to an actuator (e.g., a pulley or a gear), such as, for instance, the actuator 210 described above with reference to the embodiment illustrated in FIG. 3, configured to modify the mechanical response of the structure 300 when a load is applied to the tip 312 of the structure 300. The tensile member 303 and the compressive members 301, 302 may be the same or similar to the tensile member 103 and the compressive members 101, 102 described above with reference to the embodiment illustrated in FIGS. 1A-1D.

With continued reference to the embodiment illustrated in FIG. 4, the negative stiffness structure 300 also includes a pair of wedge-shaped inserts 313, 314 disposed between the inner ends 304, 305 and the outer ends 307, 308, respectively, of the upper and lower compressive members 301, 302 (i.e., the wedge-shaped inserts 313, 314 are located at opposite ends between the compressive members 301, 302). That is, in the illustrated embodiment, the wedge-shaped insert 313 is located proximate the inner ends 304, 305 of the compressive members 301, 302 and the wedge-shaped insert 314 is located proximate the outer ends 307, 308 of the compressive members 301, 302. In one embodiment, the wedge-shaped inserts 313, 314 may be made out of any suitable elastic material, such as, for instance, natural or synthetic rubber (e.g., a synthetic viscoelastic urethane polymer manufactured by Sorbothane, Inc.). The wedge-shaped inserts 313, 314 may be coupled to the compressive members 301, 302 by any suitable process, such as, for instance, bonding, adhering, or molding. In the illustrated embodiment, the wedge-shaped inserts 313, 314 match or substantially match the shape or contour of the inner and outer ends 304, 305, 307, 308 of the compressive members 301, 302 when the negative stiffness structure 300 is in a neutral position. Additionally, in one embodiment, the wedge-shaped inserts 313, 314 may be configured elastically deform to match the shape or contour of the inner and outer ends 304, 305, 307, 308 of the compressive members 301, 302 as the compressive members 301, 302 buckle in response to an external load applied to the tip 312 of the structure 300. The wedge-shaped inserts 313, 314 are configured to provide additional stability to the negative stiffness structure 300 at high deflections of the tip 312 of the structure 300 without requiring additional pre-shaping of the compressive members 301, 302. Accordingly, the wedge-shaped inserts 313, 314 are configured to increase the negative stiffness or mass efficiency of the structure 300.

Figure 5:
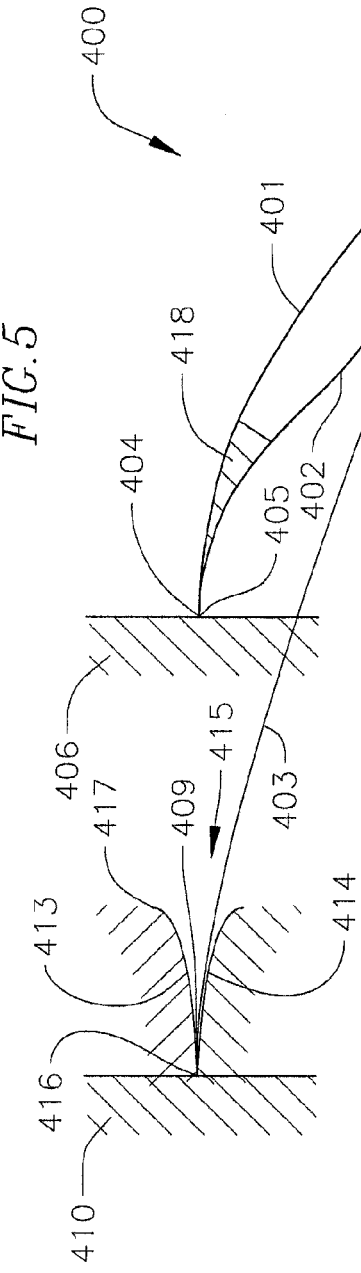
FIG. 5 is a schematic side view of a negative stiffness structure according to another embodiment of the present disclosure.

With reference now to the embodiment illustrated in FIG. 5, a negative stiffness structure 400 according to another embodiment of the present disclosure includes a pair of upper and lower compressive members 401, 402 and a tensile member 403. Inner ends 404, 405 of the compressive members 401, 402, respectively, are fixedly coupled to a first structure 406 and outer ends 407, 408 of the compressive members 401, 402 are free. In the illustrated embodiment, the inner ends 404, 405 and the outer ends 407, 408, respectively, of the compressive members 401, 402 are coupled together. The compressive members 401, 402 are preformed into a curved or contoured shape (e.g., a cosine shape) extending in opposite directions (e.g., the upper compressive member 401 is curved upward and the lower compressive member 402 is curved downward). Additionally, in the illustrated embodiment, an inner end 409 of the tensile member 403 is coupled to a second structure 410 and an outer end 411 of the tensile member 403 is coupled to the outer ends 407, 408 of the compressive members 401, 402. Together, the outer ends 411, 407, 408 of the tensile member 403 and the compressive members 401, 402 define a tip 412 of the negative stiffness structure 400. The tensile member 403 and the compressive members 401, 402 may be the same or similar to the tensile member 103 and the compressive members 101, 102 described above with reference to the embodiment illustrated in FIGS. 1A-1D.

Still referring to the embodiment illustrated in FIG. 5, the second structure 410 includes a pair of curved walls or surfaces 413, 414 diverging apart from each other. Together, the curved walls 413, 414 define a tapered or wedge-like recess 415. The recess 415 tapers between a narrower end 416 and a wider end 417 along a direction extending from the inner end 409 to the outer end 411 of the tensile member 403. The inner end 409 of the tensile member 403 is received in the tapered recess 415 defined by the pair of curved walls 413, 414 of the second structure 410. Accordingly, as the tip 412 of the structure 400 is deflected either upward or downward, a contact point between the tensile member 403 and the second structure 410 shifts in a direction toward the outer end 411 of the tensile member 403 (e.g., the contact point between the tensile member 403 and the upper or lower curved wall 413, 414 of the second structure 410 continuously changes during the stroke of the tip 412 of the structure 400). Varying the contact point between the tensile member 403 and the second structure 410 is configured to passively change the effective length of the tensile member 403 and thereby alter the mechanical response of the structure 400. As used herein, the "effective length" of the tensile member 403 is defined as the length of the tensile member 403 from the contact point between the tensile member 403 and one of the curved walls 413, 414 and the outer end 411 of the tensile member 403. In one or more alternate embodiments, the structure 400 may include a plurality of discrete stops configured to passively adjust the effective length of the tensile member 403. For instance, in one embodiment, the curved walls 413, 414 of the second structure 410 may include a plurality of discrete projections or edges (e.g., the curved walls 413, 414 may not be smooth). The contact between the discrete projections and the tensile member 403 is configured to adjust the effective length of the tensile member 403.

Additionally, in the embodiment illustrated in FIG. 5, the negative stiffness structure 400 also includes a pair of wedge-shaped inserts 418, 419 disposed between opposite ends of the compressive members 401, 402. In one embodiment, the wedge-shaped inserts 418, 419 may be the same or similar to the wedge-shaped inserts 313, 314 described above with reference to the embodiment illustrated in FIG. 4. In one or more alternate embodiments, the negative stiffness structure 400 may be provided without the wedge-shaped inserts 418, 419.

Figure 6:
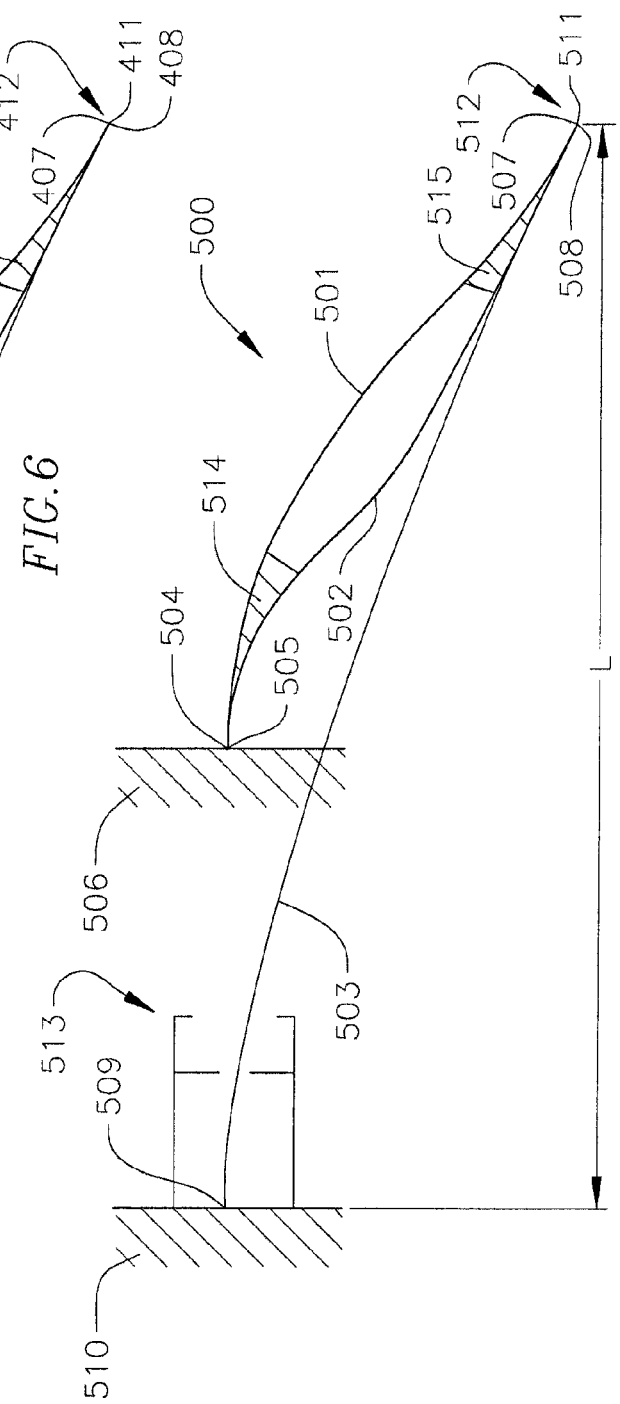
FIG. 6 is a schematic side view of a negative stiffness structure according to another embodiment of the present disclosure.

With reference now to the embodiment illustrated in FIG. 6, a negative stiffness structure 500 according to another embodiment of the present disclosure includes a pair of upper and lower compressive members 501, 502 and a tensile member 503. Inner ends 504, 505 of the compressive members 501, 502, respectively, are fixedly coupled to a first structure 506 and outer ends 507, 508 of the compressive members 501, 502 are free. In the illustrated embodiment, the inner ends 504, 505 and the outer ends 507, 508, respectively, of the compressive members 501, 502 are coupled together. The compressive members 501, 502 are preformed into a curved or contoured shape (e.g., a cosine shape) extending in opposite directions (e.g., the upper compressive member 501 is curved upward and the lower compressive member 502 is curved downward). Additionally, in the illustrated embodiment, an inner end 509 of the tensile member 503 is coupled to a second structure 510 and an outer end 511 of the tensile member 503 is coupled to the outer ends 507, 508 of the compressive members 501, 502. Together, the outer ends 511, 507, 508 of the tensile member 503 and the compressive members 501, 502 define a tip 512 of the negative stiffness structure 500. The tensile member 503 and the compressive members 501, 502 may be the same or similar to the tensile member 103 and the compressive members 101, 102 described above with reference to the embodiment illustrated in FIGS. 1A-1D.

With continued reference to the embodiment illustrated in FIG. 6, the negative stiffness structure 500 also includes a clamp 513 coupled to the second structure 510. The clamp 513 is configured to clamp onto the tensile member 503 at various points or positions along the length of the tensile member 503. Clamping onto the tensile member 503 is configured to actively alter the effective length of the tensile member 503 and thereby vary the mechanical response of the structure 500, as described below with reference to FIG. 7. When the clamp 513 engages the tensile member 503, the effective length of the tensile member 503 is defined as the length of the tensile member 503 from the clamping point to the outer end 511 of the tensile member 503.

Additionally, although in the illustrated embodiment the negative stiffness structure 500 also includes a pair of wedge-shaped inserts 514, 515 disposed between opposite ends of the compressive members 501, 502, in one or more alternate embodiments, the negative stiffness structure 500 may be provided without the wedge-shaped inserts 514, 515. In one embodiment, the wedge-shaped inserts 514, 515 may be the same or similar to the wedge-shaped inserts 313, 314 described above with reference to the embodiment illustrated in FIG. 4.

Figure 7:
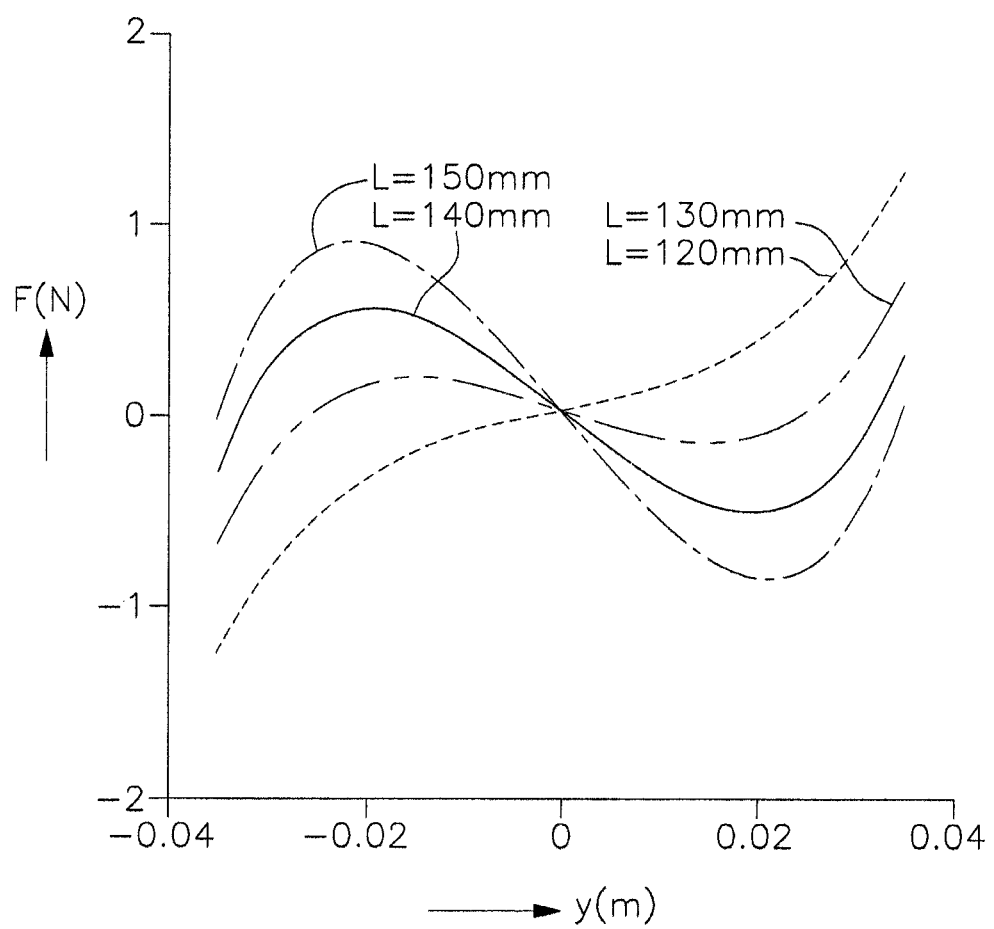
FIG. 7 is a graph illustrating the mechanical response of the negative stiffness structure of FIG. 6 for a range of different clamping positions of the tensile member.

FIG. 7 is a plot showing the mechanical response of the embodiment of the negative stiffness structure 500 illustrated in FIG. 6 for a range of different clamping positions at which the clamp 513 is clamped onto the tensile member 503. As described above, the clamp 513 is configured to reduce the effective length of the tensile member 503 by clamping onto the tensile member 503. In particular, FIG. 7 illustrates the mechanical response of the negative stiffness structure 500 when the effective length of the tensile member 503 has been reduced from an initial length L of approximately or about 150 mm to approximately or about 140 mm, approximately or about 130 mm, and approximately or about 120 mm.

When the clamp 513 was not actuated, such that the tensile member 503 had an effective length equal to its overall length L of approximately or about 150 mm, the structure 500 exhibited positive stiffness from a range of tip 512 deflections from approximately or about −0.02 m to approximately or about +0.02 m and the structure 500 exhibited negative stiffness for a range of tip 512 deflections from approximately or about −0.02 m to approximately or about −0.04 m and from approximately or about +0.02 m to approximately or about +0.04 m. Additionally, the structure 500 exhibited a maximum positive stiffness force of approximately or about 0.9N and a maximum negative stiffness force of approximately or about 0N. When the clamp 513 was actuated such that the tensile member 503 has an effective length of approximately or about 140 mm (i.e., the clamp 513 was clamped onto the tensile member 503 at approximately or about 10 mm from the inner end 509 of the tensile member 503), the structure 500 exhibited positive stiffness for a range of tip 512 deflections from approximately or about −0.02 m to approximately or about +0.02 m, a maximum positive stiffness force of approximately or about 0.5N, and a maximum negative stiffness force of approximately or about 0.2N. When the clamp 513 was actuated such that the tensile member 503 had an effective length of approximately or about 130 mm (i.e., the clamp 513 was clamped onto the tensile member 503 at approximately or about 20 mm from the inner end 509 of the tensile member 503), the structure 500 exhibited positive stiffness for a range of tip 512 deflections from approximately or about −0.02 m to approximately or about +0.02 m, a maximum positive stiffness force of approximately or about 0.1N, and a maximum negative stiffness force of approximately or about 0.7N. When the clamp 513 was actuated such that the tensile member 503 had an effective length of approximately or about 120 mm (i.e., the clamp 513 was clamped onto the tensile member 503 at approximately or about 30 mm from the inner end 509 of the tensile member 503), the structure 500 exhibited negative stiffness across the entire range of tip 512 deflections from approximately or about −0.04 m to approximately or about +0.04 m and exhibited a maximum negative stiffness force of approximately or about 1.2N.

With reference now to the embodiment illustrated in FIGS. 8A-8D, a negative stiffness structure 600 according to another embodiment of the present disclosure includes a pair of upper and lower compressive members 601, 602 and a tensile member 603. Inner ends 604, 605 of the compressive members 601, 602, respectively, are fixedly coupled to a first structure 606 and outer ends 607, 608 of the compressive members 601, 602 are free. In the illustrated embodiment, the inner ends 604, 605 and the outer ends 607, 608, respectively, of the compressive members 601, 602 are coupled together. The compressive members 601, 602 are preformed into a curved or contoured shape (e.g., a cosine shape) extending in opposite directions (e.g., the upper compressive member 601 is curved upward and the lower compressive member 602 is curved downward). Additionally, in the illustrated embodiment, an inner end 609 of the tensile member 603 is coupled to a second structure 610 and an outer end 611 of the tensile member 603 is coupled to the outer ends 607, 608 of the compressive members 601, 602. Together, the outer ends 611, 607, 608 of the tensile member 603 and the compressive members 601, 602 define a tip 612 of the negative stiffness structure 600. The tensile member 603 and the compressive members 601, 602 may be the same or similar to the tensile member 103 and the compressive members 101, 102 described above with reference to the embodiment illustrated in FIGS. 1A-1D.

With continued reference to the embodiment illustrated in FIGS. 8A-8D, the negative stiffness structure 600 also includes a clutching or braking mechanism 613 coupled to the first structure 606. As described in more detail below, the clutching mechanism 613 is configured to enable the angular position of the tensile member 603 and the upper and lower compressive members 601, 602 to be adjusted while maintaining the symmetry of the compressive members 601, 602 about the tensile member 603. The angular position of the tensile member 603 and the compressive members 601, 602 may be adjusted based on the structure or device into which the negative stiffness structure 600 is intended to be incorporated and/or based on the nature of the external load applied to the tip 612 of the negative stiffness structure 600. The clutching mechanism 613 may be any suitable type of mechanism for reversably locking and unlocking two surfaces together, such as, for instance, a friction type or kind clutching mechanism or a mechanical locking type or kind clutching mechanism.

Still referring to the embodiment illustrated in FIGS. 8A-8D, the clutching mechanism 613 includes an inner clutching member 614 having an outer interface surface 615 and an outer clutching member 616 having an inner interface surface 617 that matches or substantially matches the shape or contour of the outer interface surface 615 of the inner clutching member 614 (e.g., the interface surfaces 615, 617 of the inner and outer clutching members 614, 616 are complementary). In the illustrated embodiment, the outer interface surface 615 of the inner clutching member 614 is a convex surface and the inner interface surface 617 of the outer clutching member 616 is a concave surface that conforms or substantially conforms to the convex outer interface surface 615 of the inner clutching member 614. Additionally, in one embodiment, the outer interface surface 615 of the inner clutching member 614 may define an arc centered about the inner end 609 of the tensile member 603. In one or more alternate embodiments, the interface surfaces 615, 617 of the inner and outer clutching members 614, 616 may have any other shapes suitable for enabling the outer clutching member 616 to rotate or pivot (arrow 618) relative to the inner clutching member 614. For instance, in one embodiment, the inner clutching member 614 may include a concave interface surface 615 and the outer clutching member 616 may include a convex interface surface 617 (e.g., the inner and outer clutching members 614, 616 may function similar to a ball and socket joint). Additionally, in the illustrated embodiment, the inner ends 604, 605 of the compressive members 601, 602 are coupled to the outer clutching member 616.

Figure 8A:
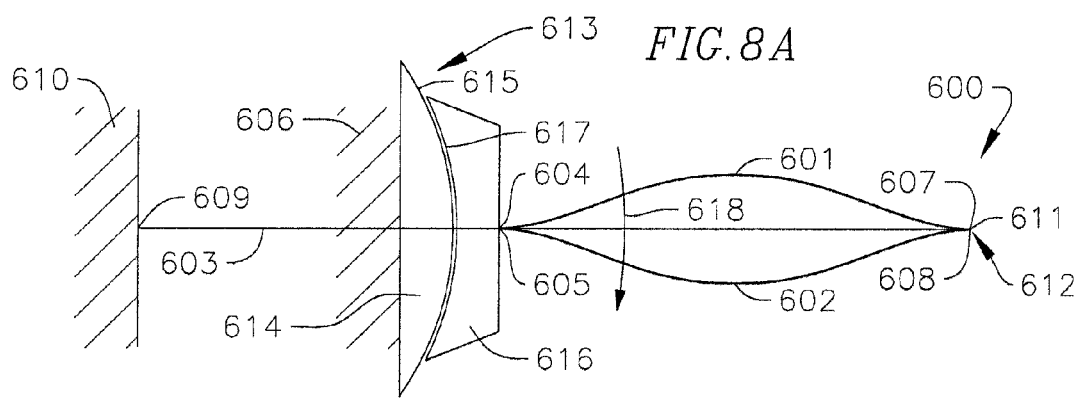
FIGS. 8A-8E are schematic side views of a negative stiffness structure according to another embodiment of the present disclosure.
Figure 8B:
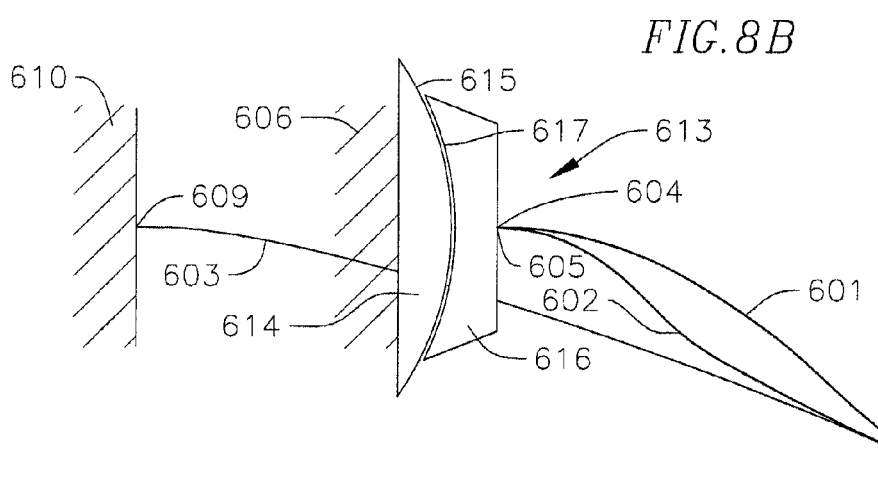

As illustrated in FIG. 8B, before the angular position of the compressive members 601, 602 and the outer clutching member 616 have been adjusted, the negative stiffness structure 600 is configured to function in the same or similar manner as the embodiment described above with reference to FIGS. 1A-1D in response to a load applied to the tip 612 of the structure 600.

Figure 8C:
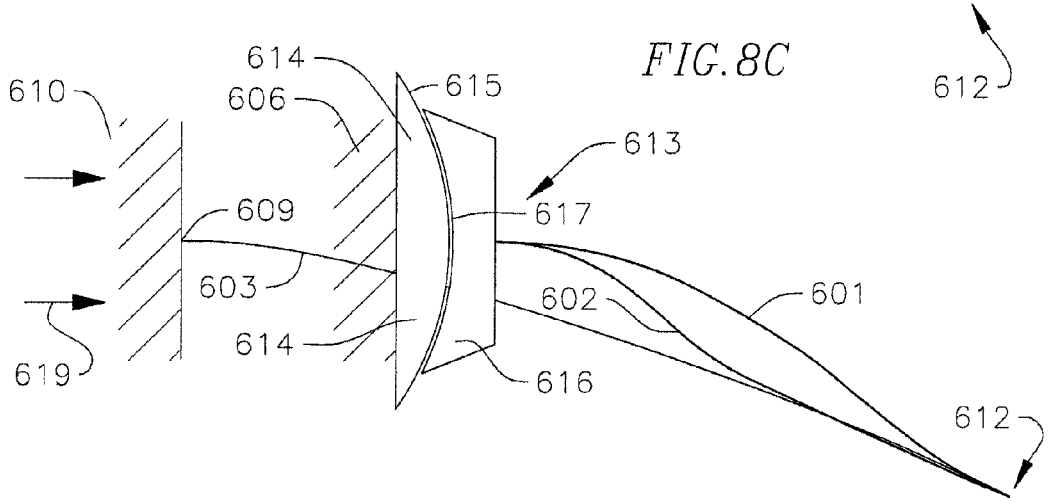

The angular position of the tensile and compressive members 601, 602 may be adjusted (arrow 618) by reducing the tension applied to the tensile member 603 or increasing the effective length of the tensile member 603. In one embodiment, the inner end 609 of the tensile member 603 may be coupled to any suitable mechanism configured to adjust the tension of the tensile member 603 or adjust the effective length of the tensile member 603. As illustrated in FIG. 8C, the tension applied to the tensile member 603 may be reduced by moving (arrow 619) the second structure 610 to which the inner end 609 of the tensile member 603 is fixedly coupled in a direction toward the outer end 611 of the tensile member 603. In another embodiment, the inner end 609 of the tensile member 603 may be coupled to an actuator (e.g., a pulley or a gear) configured to increase the effective length of the tensile member 603 and thereby decrease the tension applied to the tensile member 603.

Figure 8D:
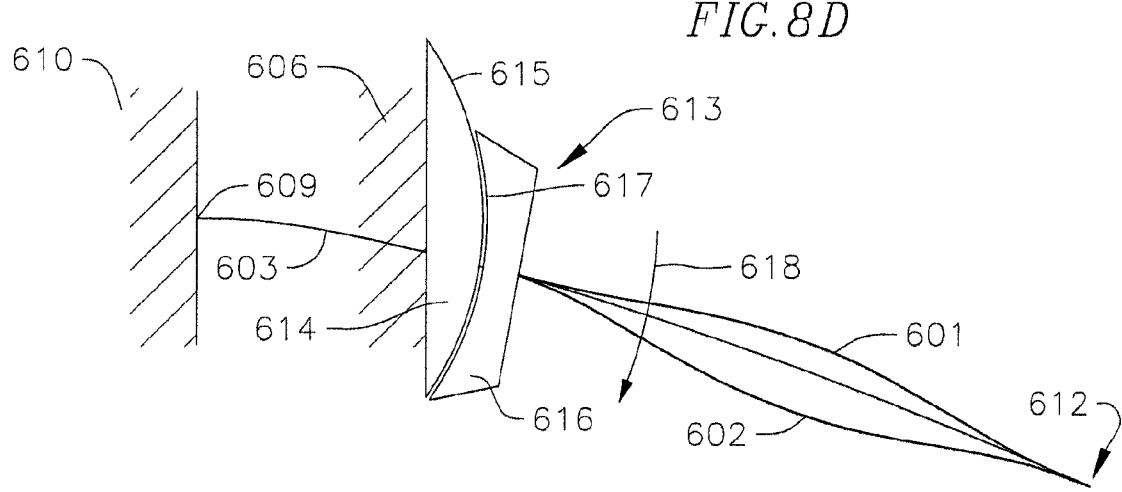
Figure 8E:
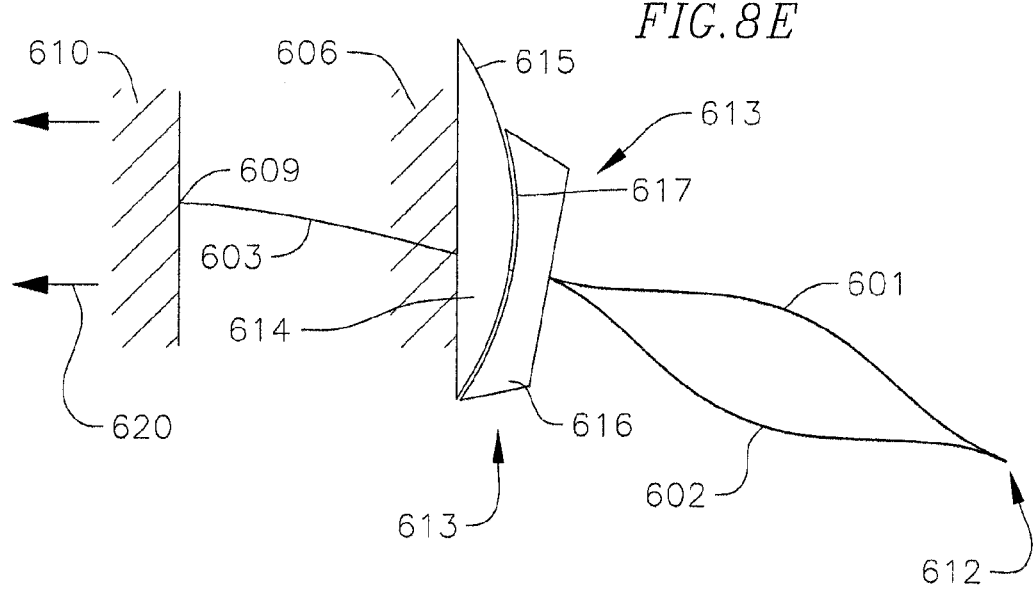

Reducing the tension applied to the tensile member 603 or increasing the effective length of the tensile member 603 is configured to reduce the compressive force applied to the compressive members 601, 602 and thereby reduce the friction between the interface surfaces 615, 617 of the inner and outer clutching members 614, 616. As illustrated in FIG. 8D, the reduced friction between the interface surfaces 615, 617 of the inner and outer clutching members 614, 616 causes or enables the outer clutching member 616 to rotate, pivot, or slide downward (arrow 618) along the interface surface 615 of the inner clutching member 614. Once the outer clutching member 616 and the compressive members 601, 602 coupled thereto have rotated down (arrow 618) into the desired angular position, as illustrated in FIG. 8E, the desired angular position may be set by increasing the tension applied to the tensile member 603 or decreasing the effective length of the tensile member 603 to increase the compressive force applied to the compressive members 601, 602. As illustrated in FIG. 8E, the tensile applied to the tensile member 603 may be increased or the effective length of the tensile member 603 may be decreased by moving (arrow 620) the second structure 610 in a direction away from the outer end 611 of the tensile member 603 or by actuating the actuator coupled to the inner end 609 of the tensile member 603.

The increased compressive force applied to the compressive members 601, 602 is configured to draw the outer clutching member 616 into tighter engagement with the inner clutching member 614 and thereby increase the friction between the interface surfaces 615, 617 of the inner and outer clutching members 614, 616. The increased friction between the interface surfaces 615, 617 of the inner and outer clutching members 614, 616 is configured to prevent the outer clutching member 616 and the compressive members 601, 602 coupled thereto from inadvertently rotating (arrow 618) relative to the inner clutching member 614. In one embodiment, the clutching mechanism 613 is configured to adjust the angular position of the tensile member 603 and the compressive members 601, 602 by approximately or about +/−10 degrees from the neutral position shown in FIG. 8A, although in one or more alternate embodiments, the clutching mechanism 613 may be configured to adjust the angular position of the tensile member 603 and the compressive members 601, 602 to any other suitable extent.

Once the negative stiffness structure 600 has been positioned into the desired angular position, the negative stiffness structure 600 is configured to function in the same or similar manner as the negative stiffness structure 100 described above in detail with reference to FIGS. 1A-1D and FIG. 2 when a load is applied to the tip 612 of the structure 600.

Additionally, in one or more alternate embodiments, the negative stiffness structure 600 may include one or more wedge-shaped inserts disposed between the compressive members 601, 602. The wedge-shaped inserts may be the same or similar to the wedge-shaped inserts 313, 314 described above with reference to the embodiment illustrated in FIG. 4.

Figure 9:
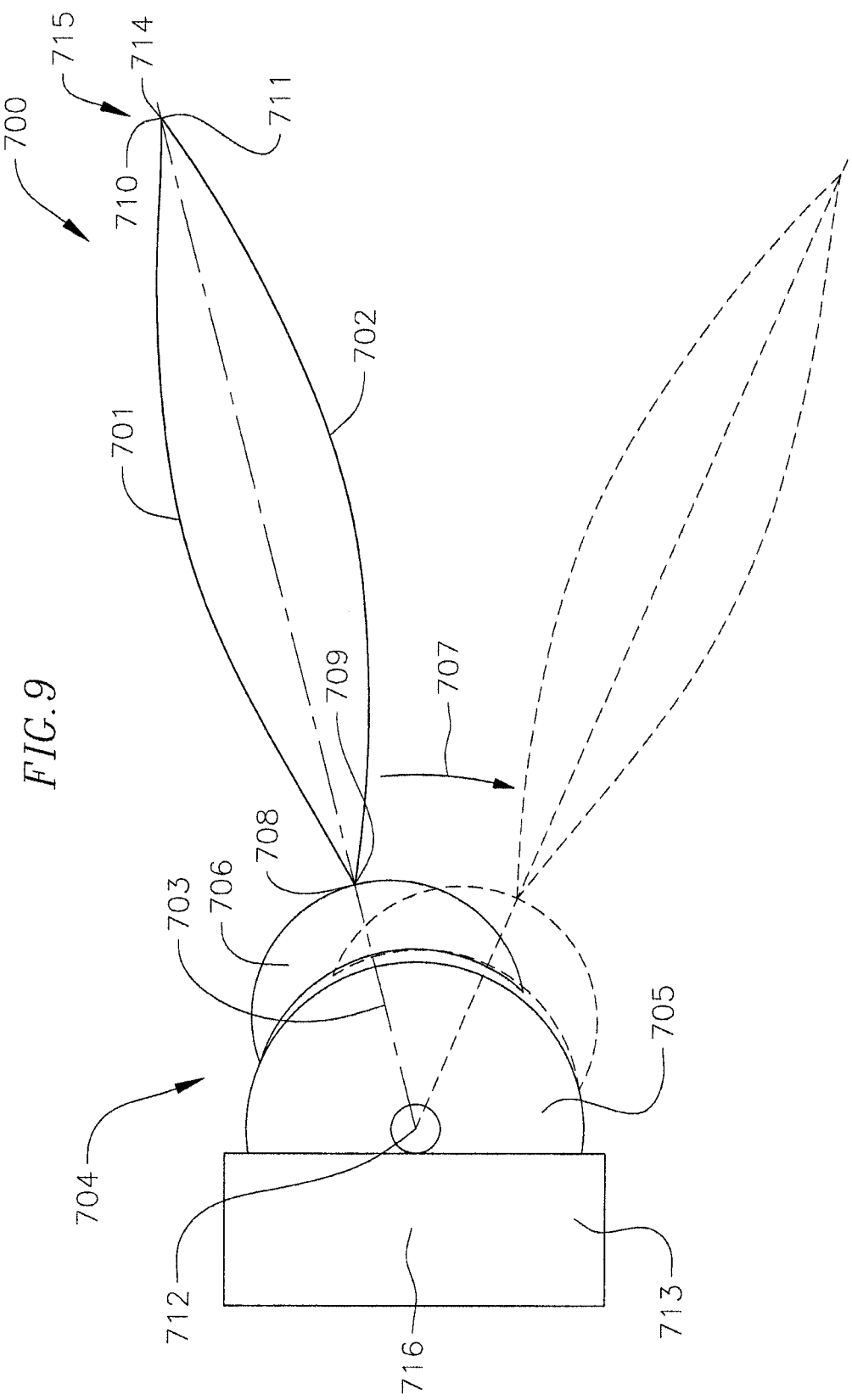
FIG. 9 is a schematic side view of a negative stiffness structure according to another embodiment of the present disclosure.

With reference now to FIG. 9, a negative stiffness structure 700 according to another embodiment of the present disclosure includes a pair of upper and lower compressive members 701, 702 and a tensile member 703. The negative stiffness structure 700 also includes a clutching mechanism 704 that includes an inner clutching member 705 and an outer clutching member 706 configured to selectively pivot or rotate (arrow 707) along the inner clutching member 705 from a first angular position (shown in solid lines) to a second angular position (shown in dashed lines). As described above with reference to the embodiment illustrated in FIGS. 8A-8D, the clutching mechanism 704 is configured to enable the angular position of the tensile member 703 and the upper and lower compressive members 701, 702 to be adjusted, such as, for instance, based on the structure or device into which the negative stiffness structure 700 is intended to be incorporated and/or based on the nature of the external load applied to the negative stiffness structure 700. Inner ends 708, 709 of the compressive members 701, 702, respectively, are fixedly coupled to the outer clutching member 706 and outer ends 710, 711 of the compressive members 701, 702 are free. In the illustrated embodiment, the inner ends 708, 709 and the outer ends 710, 711, respectively, of the compressive members 701, 702 are coupled together. The compressive members 701, 702 are preformed into a curved or contoured shape (e.g., a cosine shape) extending in opposite directions (e.g., the upper compressive member 701 is curved upward and the lower compressive member 602 is curved downward). Additionally, in the illustrated embodiment, an inner end 712 of the tensile member 703 is coupled to a structure 713 and an outer end 714 of the tensile member 703 is coupled to the outer ends 710, 711 of the compressive members 701, 702. Together, the outer ends 714, 710, 711 of the tensile member 703 and the compressive members 701, 702 define a tip 715 of the negative stiffness structure 700. The tensile member 703 and the compressive members 701, 702 may be the same or similar to the tensile member 103 and the compressive members 101, 102 described above with reference to the embodiment illustrated in FIGS. 1A-1D. The clutching mechanism 704 may be the same or similar to the clutching mechanism 613 described above with reference to FIGS. 8A-8D. In one embodiment, the structure 713 also includes an actuator 716 configured to adjust the tension applied to the tensile member 703. Adjusting the tension of the tensile member 703 is configured to increase or decrease the friction between the inner and outer clutching members 705, 706 and thereby lock the angular position of the compressive members 701, 702 and the tensile member 703 or permit the outer clutching member 706 and the compressive members 701, 702 to rotate (arrow 707) along the inner clutching member 705 into a different angular position (shown in dashed lines).

Figure 10:
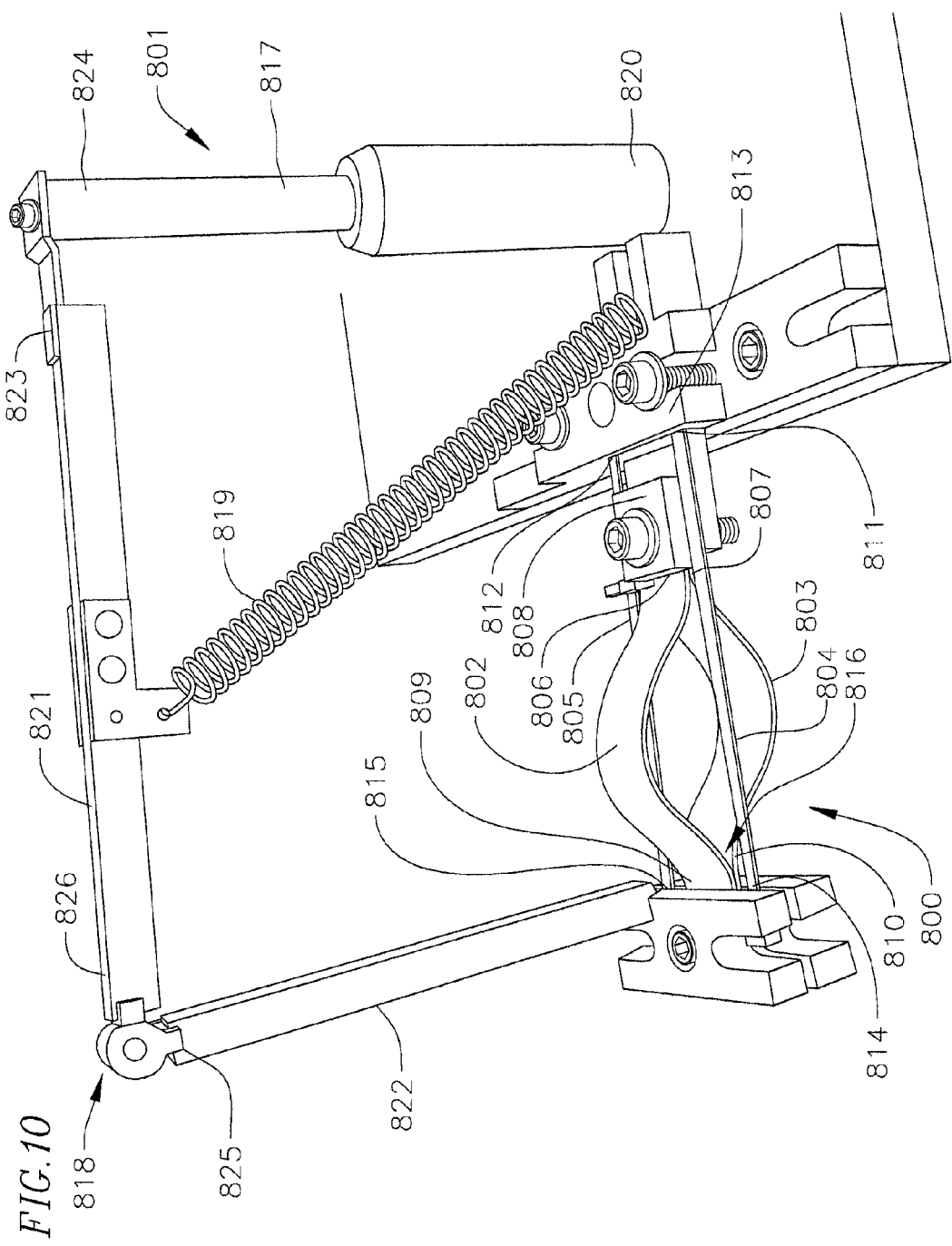
FIG. 10 is a side view of a negative stiffness structure according to one embodiment of the present disclosure incorporated into a host structure.

FIG. 10 illustrates a negative stiffness structure 800 according to one embodiment of the present disclosure integrated with a host structure 801. The negative stiffness structure 800 may be the same or similar to any one of the embodiments described above. In the illustrated embodiment, the negative stiffness structure 800 includes a pair of upper and lower compressive members 802, 803 and a pair of tensile members 804, 805. Inner ends 806, 807 of the compressive members 802, 803, respectively, are fixedly coupled to a first structure 808. In the illustrated embodiment, the inner ends 806, 807 and outer ends 809, 810, respectively, of the compressive members 802, 803 are coupled together. The compressive members 802, 803 are preformed into a curved or contoured shape (e.g., a cosine shape) extending in opposite directions (e.g., the upper compressive member 802 is curved upward and the lower compressive member 803 is curved downward). Additionally, in the illustrated embodiment, inner ends 811, 812 of the tensile members 804, 805 are coupled to a second structure 813 and outer ends 814, 815 of the tensile members 804, 805 are coupled to the outer ends 809, 810 of the compressive members 802, 803. Together, the outer ends 814, 815, 809, 810 of the tensile members 804, 805 and the compressive members 802, 803 define a tip 816 of the negative stiffness structure 800. The tensile members 804, 805 and the compressive members 802, 803 may be the same or similar to the tensile member 103 and the compressive members 101, 102 described above with reference to the embodiment illustrated in FIGS. 1A-1D.

Still referring to the embodiment illustrated in FIG. 10, the host structure 801 includes a tie rod 817, a positive stiffness swing arm 818, and a spring 819. In the illustrated embodiment, a lower end 820 of the tie rod 817 is coupled to the second structure 813 to which the inner ends 811, 812 of the tensile members 804, 805 are coupled. The tie rod 817 extends upward from the second structure 813. The swing arm 818 includes a horizontal member 821 and a vertical member 822 hingedly coupled to the horizontal member 821. An inner end 823 of the horizontal member 821 is coupled to and extends outward from an upper end 824 of the tie rod 817. An upper end 825 of the vertical member 822 is hingedly coupled to an outer end 826 of the horizontal member 821. A lower end 827 of the vertical member 822 is coupled to the outer ends 814, 815, 809, 810 of the tensile members 804, 805 and the compressive members 802, 803. In the illustrated embodiment, the spring 819 extends between an intermediate portion of the horizontal member 821 and the second structure 813 to which the inner ends 811, 812 of the tensile members 804, 805 are coupled.

The mechanical response of the tip 816 of the negative stiffness structure 800 is transmitted to the vertical member 822 of the swing arm 818. Additionally, the mechanical response of the negative stiffness structure 800 may be varied by adjusting the tension applied to the tensile members 804, 805 or adjusting the effective length of the tensile members 804, 805. The negative stiffness structure 800 may include any suitable mechanism for adjusting the tension applied to the tensile members 804, 805 and/or adjusting the effective length of the tensile members 804, 805, such as, for instance, an actuator (e.g., a pulley or a gear) coupled to the inner ends 811, 812 of the tensile members 804, 805. For instance, in one embodiment, the mechanical response of the negative stiffness structure 800 may be varied as shown in FIG. 2.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, when a component is component is referred to as being "coupled" to another component, it can be directly attached to the other component or intervening components may be present therebetween.

What is claimed is:

1. A negative stiffness structure, comprising:
at least one flexible tensile member having a first end and a second end, the first end coupled to a first structure; and
a first curved compressive member having a first end and a second end, the first end coupled to a second structure, the second end of the first curved compressive member directly coupled to the second end of the tensile member, wherein
a length of the tensile member is greater than a length of the first curved compressive member, and
a tip of the negative stiffness structure is configured to exhibit a negative stiffness mechanical response to a load applied to the tip, the negative stiffness mechanical response acting in a direction orthogonal to the length of the tensile member.

2. The negative stiffness structure of claim 1, further comprising a second curved compressive member having a first end coupled to the second structure and a second end coupled to the second end of the tensile member.

3. The negative stiffness structure of claim 2, wherein the first curved compressive member is buckled in a first direction, and wherein the second curved compressive member is buckled in a second direction opposite the first direction.

4. A negative stiffness structure, comprising:
at least one flexible tensile member having a first end and a second end, the first end coupled to a first structure;
a first curved compressive member having a first end and a second end, the first end coupled to a second structure, the second end coupled to the second end of the tensile member; and
a second curved compressive member having a first end coupled to the second structure and a second end coupled to the second end of the tensile member, wherein:
a length of the tensile member is greater than a length of the first curved compressive member,
a tip of the negative stiffness structure is configured to exhibit a negative stiffness mechanical response to a load applied to the tip, the negative stiffness mechanical response acting in a direction orthogonal to the length of the tensile member, and the first and second curved compressive members are cosine shaped.

5. The negative stiffness structure of claim 2, further comprising first and second wedge-shaped inserts between the first curved compressive member and the second curved compressive member, the first wedge-shaped insert proximate the first ends of the first and second curved compressive members, and the second wedge-shaped insert proximate the second ends of the first and second curved compressive members.

6. The negative stiffness structure of claim 1, wherein the first structure comprises a pair of curved walls defining a tapered recess, and wherein the first end of the tensile member is received in the tapered recess.

7. The negative stiffness structure of claim 1, further comprising an actuator coupled to the first end of the tensile member, the actuator configured to adjust tension applied to the tensile member or adjust an effective length of the tensile member to vary the mechanical response of the tip.

8. The negative stiffness structure of claim 1, further comprising a clamping actuator coupled to the first end of the tensile member, the clamping actuator configured to clamp the tensile member at a plurality of positions along a length of the tensile member.

9. The negative stiffness structure of claim 1, wherein the second structure comprises a clutching mechanism, the clutching mechanism comprising:

a first clutching member having a convex surface; and a second clutching member having a concave surface mating with the convex surface of the first clutching member, wherein the second clutching member is configured to slide along the convex surface of the first clutching member between a first angular position and a second angular position.

10. The negative stiffness structure of claim 1, wherein the first curved compressive member has a substantially uniform thickness.

11. A negative stiffness structure, comprising:

at least one flexible tensile member having a first end and a second end, the first end coupled to a first structure; and a first curved compressive member having a first end and a second end, the first end coupled to a second structure, the second end coupled to the second end of the tensile member, wherein:

a length of the tensile member is greater than a length of the first curved compressive member, a tip of the negative stiffness structure is configured to exhibit a negative stiffness mechanical response to a load applied to the tip, the negative stiffness mechanical response acting in a direction orthogonal to the length of the tensile member, and wherein the first curved compressive member has a non-uniform thickness.

12. A negative stiffness structure, comprising:

at least one flexible tensile member having a first end and a second end, the first end coupled to a first structure; and a first curved compressive member having a first end and a second end, the first end coupled to a second structure, the second end coupled to the second end of the tensile member, wherein:

a length of the tensile member is greater than a length of the first curved compressive member, a tip of the negative stiffness structure is configured to exhibit a negative stiffness mechanical response to a load applied to the tip, the negative stiffness mechanical response acting in a direction orthogonal to the length of the tensile member, and the first curved compressive member comprises a stack of a plurality of curved compressive members.

13. The negative stiffness structure of claim 1, wherein the at least one flexible tensile member comprises a plurality of tensile members.

14. The negative stiffness structure of claim 1, wherein the compressive member is a rectangular beam.

15. The negative stiffness structure of claim 1, wherein the at least one tensile member is selected from the group consisting of a beam, a rope, a cable, a rod, a chain, or a belt.

* * * * *